United States Patent
Hayashi

(10) Patent No.: US 10,145,347 B2
(45) Date of Patent: Dec. 4, 2018

(54) FUEL RAIL

(71) Applicant: USUI KOKUSAI SANGYO KAISHA, LTD., Shizuoka (JP)

(72) Inventor: Koichi Hayashi, Shizuoka (JP)

(73) Assignee: USUI CO., LTD., Sunto-gun, Shizuoka (JP)

( * ) Notice: Subject to any disclaimer, the term of this patent is extended or adjusted under 35 U.S.C. 154(b) by 11 days.

(21) Appl. No.: 15/542,076

(22) PCT Filed: Dec. 14, 2015

(86) PCT No.: PCT/JP2015/006214
§ 371 (c)(1),
(2) Date: Jul. 7, 2017

(87) PCT Pub. No.: WO2016/116982
PCT Pub. Date: Jul. 28, 2016

(65) Prior Publication Data
US 2018/0087482 A1    Mar. 29, 2018

(30) Foreign Application Priority Data

Jan. 22, 2015  (JP) ................... 2015-009970

(51) Int. Cl.
*F02M 63/02*    (2006.01)
*C22C 38/12*    (2006.01)
(Continued)

(52) U.S. Cl.
CPC .......... *F02M 63/0225* (2013.01); *C21D 9/08* (2013.01); *C21D 9/14* (2013.01); *C22C 38/00* (2013.01);
(Continued)

(58) Field of Classification Search
CPC .............. F02M 63/0225; F02M 63/023; F02M 63/0275; F02M 55/04; F02M 55/02;
(Continued)

(56) References Cited

U.S. PATENT DOCUMENTS

| | | | |
|---|---|---|---|
| 2003/0111056 A1* | 6/2003 | Miandoab | F02M 55/025 123/456 |
| 2005/0127665 A1* | 6/2005 | Usui | F02M 55/025 285/197 |
| 2009/0032149 A1* | 2/2009 | Toyoshima | C21D 1/28 148/570 |

FOREIGN PATENT DOCUMENTS

| | | |
|---|---|---|
| JP | S58-123818 A | 7/1983 |
| JP | 2000-329030 | 11/2000 |

(Continued)

OTHER PUBLICATIONS

International Search Report for PCT/JP2015/006214 dated Jan. 26, 2016.

*Primary Examiner* — Lindsay Low
*Assistant Examiner* — George Jin
(74) *Attorney, Agent, or Firm* — Yokoi & Co., U.S.A.; Toshiyuki Yokoi

(57) ABSTRACT

To obtain a fuel rail that maintains low hardness and good formability before being formed into a tube stock, can be made to easily form a thin absorbing wall surface, and has a high hardness and pressure resistance so as to be usable not only at a fuel pressure of 400 kPa or less, but also at a relatively high fuel pressure of 400 kPa or more. A fuel rail for port injection that is provided with a fuel pressure absorbing wall surface 1 and is used at a fuel pressure of 200 kPa to 1400 kPa. The fuel rail comprises an iron alloy that includes chemical components of C, Si, Mn, P, S, Nb, and Mo. The fuel rail has an internal volume of at least 60 cc and an amount of change in internal volume, when pressure is (Continued)

applied, of at least 0.5 cc/MPa. A bainitic structure can be precipitated by brazing the fuel rail in a furnace during manufacturing.

2 Claims, 1 Drawing Sheet

(51) Int. Cl.
*C21D 9/08* (2006.01)
*C22C 38/00* (2006.01)
*F02M 55/02* (2006.01)
*C21D 9/14* (2006.01)
*F02M 55/04* (2006.01)
*C22C 38/02* (2006.01)
*C22C 38/04* (2006.01)

(52) U.S. Cl.
CPC ............ *C22C 38/002* (2013.01); *C22C 38/12* (2013.01); *F02M 55/02* (2013.01); *F02M 55/025* (2013.01); *F02M 55/04* (2013.01); *C21D 2211/002* (2013.01); *C21D 2211/005* (2013.01); *C21D 2211/009* (2013.01); *C22C 38/02* (2013.01); *C22C 38/04* (2013.01)

(58) Field of Classification Search
CPC .......... F02M 55/025; C21D 9/08; C21D 9/14; C21D 2211/002; C21D 2211/005; C21D 2211/009; C22C 38/00; C22C 38/04
See application file for complete search history.

(56) References Cited

FOREIGN PATENT DOCUMENTS

| | | |
|---|---|---|
| JP | 2000-329031 A | 11/2000 |
| JP | 2002-295338 A | 10/2002 |
| JP | 2007-231353 | 9/2007 |
| JP | 2010-106353 A | 5/2010 |
| JP | 2012-007535 A | 1/2012 |
| JP | 2012-126974 A | 7/2012 |

\* cited by examiner

FUEL RAIL

TECHNICAL FIELD

The invention relates to a fuel rail for port injection provided with an absorbing wall surface having pulsation absorbing performance.

BACKGROUND ART

A pulsation damper is added to a fuel rail in a gasoline port injection system used widely in prior art in order to absorb injection pulsation and pump pulsation. However, pulsation dampers are expensive per se and may result in a cost increase due to the requirements of a large number of components, and cause a new problem in ensuring installation space. Fuel rails provided with an absorbing wall surface as shown in patent documents 1 and 2 are already well-known, for providing a pulsation reducing effect without using a pulsation damper.

A flat cross section or incurved cross section of a fuel rail is necessary to form this kind of absorbing wall, having good formability and made of a material having a relatively low hardness in order to form it into such a cross sectional shape. In recent years, improvement of the injection rate is required by changing fuel to increase fuel pressure in order to improve fuel efficiency and due to more stringent emission regulations. However, the conventional fuel rails for port injection as shown in patent documents 1 and 2 cover relatively low fuel pressures of 400 kPa or lower.

PRIOR ART DOCUMENTS

Patent Documents

Patent document 1: JP2000329030
Patent document 2: JP2000329031

DISCLOSURE OF THE INVENTION

Problems to be Solved by the Invention

Thus, the conventional fuel rails as shown in patent documents 1 and 2 are made of materials having a relatively low hardness ensuring high formability, and in the case of forming an absorbing wall surface with a reduced wall thickness for weight reduction, they are permanently deformed due to large bending of the absorbing wall by the internal pressure when used under relatively high fuel pressure of 400 kPa or higher, making it difficult to ensure performance and there is a further possibility of destroyed fuel rail which may cause fuel leakage.

On the other hand, if the fuel rail is made of conventionally known high strength materials, it is difficult to form it into a flat or incurved shaped cross section due to high hardness of the material even if a reduction in thickness is attempted at the time of manufacturing. Since the fuel rails are assembled by in-furnace brazing, even if conventional high strength materials are used, the strength of the materials is lowered due to annealing of the materials brazed in a furnace and as a result, it is difficult to get a high-strength product.

In order to solve the above problems, it is conceivable to increase the thickness of the fuel rail to improve the rigidity of the fuel rail, but the pulsation absorbing performance may be lowered when the thickness of the fuel rail is increased as it becomes difficult to bend the absorbing wall while the pressure resistance may be improved.

This invention aims at solving the problems mentioned above, and therefore, at providing a fuel rail that maintains low hardness and good formability before being formed into a tube stock, wherein it can easily form a thin absorbing wall surface, and has a hardness and pressure resistance so as to be usable not only at a fuel pressure of 400 kPa or less, but also at a relatively high fuel pressure of 400 kPa or more.

Means for Solving the Problem

This invention aims at solving the problems mentioned above, and provides a fuel rail for port injection to be used at a fuel pressure of 200 kPa to 1400 kPa, with a fuel pressure absorbing wall surface comprising an iron alloy that includes chemical components of C, Si, Mn, P, S, Nb, and Mo, wherein it has an internal volume of 60 cc or more and the amount of change of the internal volume is 0.5 cc/MPa or more when pressure is applied, and wherein a bainitic structure can be precipitated by brazing the fuel rail in a furnace during manufacturing. Note that, the in-furnace brazing processing of the invention means a process of rising the temperature to 1000° C. or more in a furnace and gradually cooling down afterwards from this temperature to room temperature.

Further, the internal volume may be 60 cc~150 cc while the amount of change in internal volume may be 0.5 cc/MPa~2.5 cc/MPa when pressure is applied.

Effects of the Invention

As described above, the invention comprises an iron alloy that includes chemical components of C, Si, Mn, P, S, Nb, and Mo and forms a ferrite structure or ferrite-pearlite structure before being formed into a tube stock. For that reason, low hardness can be maintained in this state which makes it easier to process the cross sectional shape of the tube stock to have a flat shape and an incurved shape, and it is possible to easily process an absorbing wall surface.

In addition, a bainitic structure is precipitated by performing the in-furnace brazing processing in this state. As a result, the material composed of this bainitic structure has high strength to ensure high pressure resistance compared with conventional materials. Without adding a special manufacturing process, the entire shape can be formed with a reduced wall thickness for weight reduction, wherein fuel pressure hardly causes deformation and breakage due to characteristics such as high strength and high pressure resistance, and thus the invention provides a product that allows to be used not only at a fuel pressure of 400 kPa or less, but also at relatively high fuel pressure of 400 kPa or more, which is difficult to be used in the prior art.

MODES FOR CARRYING OUT THE INVENTION

A fuel rail for port injection of the Examples of this invention is described below. First, among the iron alloy materials constituting this example, the chemical components other than iron and impurities and the compounding ratio with respect to all components are shown in Table 1 below.

TABLE 1

|  | C (mass %) | Si (mass %) | Mn (mass %) | P (mass %) | S (mass %) | Nb (mass %) | Mo (mass %) |
|---|---|---|---|---|---|---|---|
| Example 1 | 0.20 | 0.21 | 1.63 | 0.010 | 0.002 | 0.026 | 0.38 |
| Example 2 | 0.18 | 0.20 | 1.25 | 0.015 | 0.002 | 0.025 | 0.25 |
| Comparative Example 1 | 0.12 | 0.35 | 0.60 | 0.040 | 0.040 | — | — |

Figure 1E:
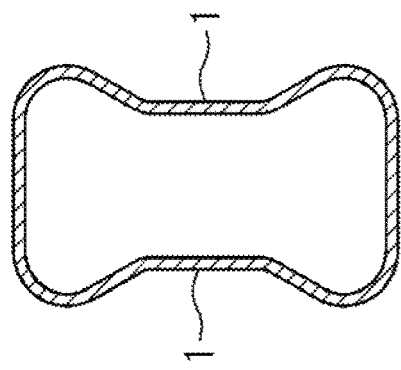
FIGS. 1A to 1E are cross sectional views showing the fuel rail of the Examples.
Figure 1C:
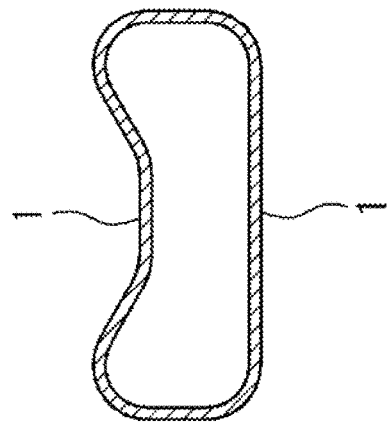
Figure 1D:
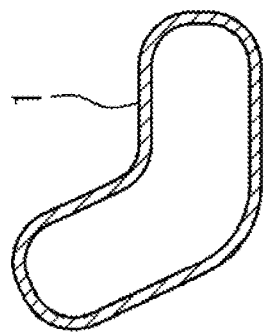
Figure 1A:
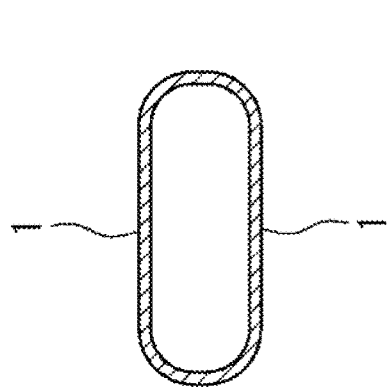
Figure 1B:
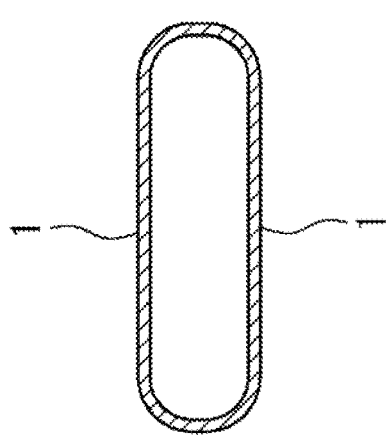

Examples 1 and 2 of the invention include C, Si, Mn, P, S, Nb, and Mo, as shown above. The production method of Examples 1 and 2 is as described in the following. In Examples 1 and 2 the iron alloy comprises the materials shown in Table 1 above, in addition to iron and the other impurities. After being formed into a tube stock, it was pressed into shapes having a cross section of a flat shape as shown in FIG. 1A. Note that, although Examples 1 and 2 had a cross section of a flat shape as shown in FIG. 1A, the tube shape is not restricted to this but may be formed into a flat or deformed tube as shown in FIG. 1B to 1E in other different examples. Further, although the tube was pressed into shapes having a cross section of a flat shape in Examples 1 and 2, any other methods than the press forming is possible to form a flat tube in other different examples.

Then the flat tube formed as mentioned above was cut down into a desired length. A plurality of holes was drilled in the mounting positions of the socket, and then each socket was connected to these holes. Further, both ends of the tube were closed by endcaps, and the bracket and the inlet pipe were assembled, respectively. Next, the assembled tube is copper-brazed in a furnace at a temperature of 1000° C. or more. After that, the tube is gradually cooled, and it is shipped as a product after leak check, surface treatment, and die matching process.

The fuel rails made of the materials of Examples 1 and 2 and formed according to the method described above are usable under a fuel pressure of 200~1400 kPa, and have an internal volume of 60 cc~150 cc as well as an amount of change in internal volume of 0.5 cc/MPa~2.5 cc/MPa. The thickness was adjusted to 0.6 mm~1.0 mm when used under a fuel pressure of 200~400 kPa while the thickness was adjusted to 1.0 mm~1.6 mm when used under a fuel pressure of 400~1400 kPa.

The fuel rails of Examples 1 and 2 were copper-brazed in a furnace as mentioned above, and in this copper brazing process, the temperature in a furnace raised to 1000° C. or more, and after that, cooled down slowly. Performing this copper-brazing in a furnace changed the physical properties of iron alloy of Examples 1 and 2 made of the materials as mentioned above. In order to examine the change in physical properties before and after the copper-brazing in a furnace, physical property testing was conducted based on the JIS standard.

Specifically, at first JIS5 test pieces (test piece thickness 1.6 mm, formed width 25 mm, and formed length 350 mm) of the materials of Examples 1 and 2 were formed and then tensile testing and structure observations were conducted by using this test pieces. The result of this tensile testing and structure observations are shown in Table 2 shown below. Note that, "Before" and "After" mean the state before the tube stock being formed, and the state after the tube stock being copper-brazed in a furnace, respectively.

TABLE 2

| Examples | Tensile Strength (MPa) | | 0.2% Proof Stress (MPa) | | Extension Coefficient (%) | | Hardness (HV) | | Structure | |
|---|---|---|---|---|---|---|---|---|---|---|
|  | Before | After | Before | After | Before | After | Before | After | Before | After |
| 1 | 675 | 722 | 434 | 499 | 23.2 | 23.4 | 225 | 238 | Ferrite Ferrite-Pearlite | Bainite |
| 2 | 568 | 628 | 361 | 434 | 26.6 | 16.0 | 190 | 211 | Ferrite Ferrite-Pearlite | Bainite |

As shown in Table 2, the values of tensile strength, 0.2% proof stress, and hardness after the copper-brazing in a furnace were larger than those values before being formed into a tube stock. Precipitation of bainite occurred in both Example 1 and Example 2 after copper-brazing in a furnace, according to structure observation of the tubes. By contrast, the structure before being formed into a tube stock was either Ferrite or Ferrite-Pearlite only, and no bainite structure was found.

It was confirmed from this results that the fuel rails of Examples 1 and 2 containing chemical components of C, Si, Mn, P, S, Nb, and Mo formed a bainite structure through the process of copper-brazing in a furnace, and could obtain high strength and high hardness properties compared to the state before being formed into a tube stock. Further, it was confirmed that as the state before being formed into a tube stock had the same ferrite or ferrite-pearlite structure as conventional one have, the materials were excellent in formability and can be proceeded easily even in manufacturing a flat tube and deformed tube.

In addition, tensile testing and structure observations were conducted based on the JIS standard, for the materials used in Example 1 and 2, and the materials used in conventional fuel rails, for confirming a difference in the materials' physical properties between Examples 1 and 2 and a conventional fuel rail which contained different chemical components compared to those of Examples 1 and 2. Comparative Example 1 in Table 1 showed the chemical components of materials other than iron and impurities used in conventional fuel rail. The chemical components of Comparative Example 1 were different from those of Examples 1 and 2 and did not include Nb and Mo Note that, JIS5 test pieces (test piece thickness 1.6 mm, formed width 25 mm, and formed length 350 mm) were used in Comparative Example 1, just like in Examples 1 and 2. The results are shown in Table 3 below.

TABLE 3

|  | Tensile Strength (MPa) | Hardness (HV) | Structure |
|---|---|---|---|
| Example 1 | 722 | 238 | Bainite |
| Example 2 | 628 | 211 | Bainite |
| Comparative Example 1 | 310 | 120 | Ferrite |

As it turned out, Examples 1 and 2 exhibit higher values with regard to both tensile strength and hardness compared to Comparative Example 1. Also, when the structure observations were conducted, in Examples 1 and 2 a bainitic structure was precipitated while Comparative Example 1 exhibited a ferrite structure, i.e., showing no precipitation of a bainitic structure. Thus, high strength and high hardness of Examples 1 and 2 were confirmed in comparison to the conventional materials.

From the above results, the entire shape of the fuel rail made of a material of

Examples 1 and 2 was formed with a reduced wall thickness for weight reduction, and the properties after the copper-brazing in a furnace became higher strength and higher pressure resistance compared with the conventional materials. As a result, a fuel rail of the invention was allowed to be used not only at a fuel pressure of 200 kPa-400 kPa which is used for a fuel rail port injection in the prior art, but also at relatively high fuel pressure of 400 kPa-1400 kPa which is difficult to be used for fuel rail for port injection in the prior art, wherein the fuel pressure in a wide range of 200 kPa-1400 kPa hardly caused deformation and breakage.

DESCRIPTION OF THE REFERENCE NUMERALS

1 Absorbing wall surface

The invention claimed is:

1. A fuel rail for port injection that is provided with a fuel pressure absorbing wall surface to be used at a fuel pressure of 200 kPa~1400 kPa, comprising an iron alloy that includes chemical components of C, Si, Mn, P, S, Nb, and Mo, and having an internal volume of 60 cc or more and an amount of change in internal volume of 0.5 cc/MPa or more when pressure is applied, wherein a bainitic structure can be precipitated by brazing the fuel rail in a furnace during manufacturing.

2. The fuel rail of claim 1, characterized by having an internal volume of 60 cc~150 cc as well as an amount of change in internal volume of 0.5 cc/MPa~2.5 cc/MPa when pressure is applied.

* * * * *